(12) United States Patent
Lee

(10) Patent No.: US 12,503,042 B2
(45) Date of Patent: Dec. 23, 2025

(54) VEHICLE APPROACH NOTIFICATION DEVICE AND METHOD THEREFOR

(71) Applicants: Hyundai Motor Company, Seoul (KR); Kia Corporation, Seoul (KR)

(72) Inventor: Su Yong Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 220 days.

(21) Appl. No.: 18/144,495

(22) Filed: May 8, 2023

(65) Prior Publication Data
US 2024/0075873 A1 Mar. 7, 2024

(30) Foreign Application Priority Data
Sep. 6, 2022 (KR) .......... 10-2022-0113018

(51) Int. Cl.
*B60Q 1/50* (2006.01)
(52) U.S. Cl.
CPC .......... *B60Q 1/5035* (2022.05); *B60Q 1/525* (2013.01)
(58) Field of Classification Search
CPC .............. B60Q 1/5035; B60Q 1/525; B60Q 2300/112; B60Q 2300/144; B60Q 1/085; B60Q 2400/50; B60Q 1/543; B60Q 2300/45; G08G 1/166; G08G 1/16
See application file for complete search history.

(56) References Cited

U.S. PATENT DOCUMENTS

| | | | |
|---|---|---|---|
| 8,733,939 B2 * | 5/2014 | Othmer .................. | B60Q 1/543 353/69 |
| 9,969,326 B2 * | 5/2018 | Ross ...................... | B60Q 5/005 |
| 2017/0240096 A1 * | 8/2017 | Ross ...................... | G05D 1/0212 |
| 2018/0297470 A1 * | 10/2018 | Kim ........................ | B60K 35/80 |
| 2021/0094539 A1 * | 4/2021 | Beller .................. | G05D 1/0214 |
| 2024/0326791 A1 * | 10/2024 | Clawson ............... | B60W 30/12 |

\* cited by examiner

Primary Examiner — Daryl C Pope
(74) Attorney, Agent, or Firm — Fox Rothschild LLP

(57) ABSTRACT

A vehicle approach notification device and a method therefor may include a camera, a sensor module, a lamp, and at least one processor electrically connected with the camera, the sensor module, and the lamp. The at least one processor detects an obstacle which may be present in the direction of progress of the vehicle using the camera and the sensor module, analyzes an angle of the obstacle, corresponding to an angle formed by a reference axis corresponding to the direction of travel of the vehicle and a first straight line, and an amount of protrusion of the obstacle, determines a vehicle entry notification display area based on the angle of the obstacle and the amount of protrusion of the obstacle, and outputs a notification to be displayed on the vehicle entry notification display area, by means of the lamp.

18 Claims, 12 Drawing Sheets

CAUTION!
CHECK THE DIRECTION WHILE
THE VEHICLE IS APPROACHING
FROM A DISTANCE OF OOM.

FIG.4

VEHICLE APPROACH NOTIFICATION DEVICE AND METHOD THEREFOR

CROSS-REFERENCE TO RELATED APPLICATION

This application claims under 35 U. S. C. § 119(a) the benefit of priority to Korean Patent Application No. 10-2022-0113018, filed in the Korean Intellectual Property Office on Sep. 6, 2022, the entire contents of which are incorporated herein by reference.

TECHNICAL FIELD

The present disclosure relates to a vehicle approach notification device and a method therefor, and more particularly, relates to technologies of displaying a vehicle approach notification on a space shown to a pedestrian or a driver of another vehicle.

BACKGROUND

In general, there may be a risk of accidents because there may be pedestrians or other vehicles which do not identify the entry of a vehicle due to other vehicles or street trees when the vehicle exits from an alleyway or a parking lot. Particularly, when the exiting vehicle may be hidden by a large truck or the like, the vehicle may not be seen from the view of a driver of another vehicle and pedestrians.

Meanwhile, a technology for projecting an image, a phrase, or the like onto various places, such as wall surfaces, floors, or ceilings, using LED lighting has been developed. Particularly, when an image, a phrase, or the like may be displayed on the floor, notification contents may be effectively delivered to a pedestrian or a driver of another vehicle.

SUMMARY

The present disclosure has been made to solve the above-mentioned problems occurring in the existing technologies while advantages achieved by the existing technologies may be maintained intact.

An embodiment of the present disclosure provides a vehicle approach notification device for determining a space shown to a pedestrian or a driver of another by analyzing an obstacle which may be present in the direction of progress of a vehicle and a method therefor.

Another embodiment of the present disclosure provides a vehicle approach notification device for displaying notification contents on a space shown to a pedestrian or a driver of another vehicle and a method therefor.

The technical problems to be solved by the present disclosure may not be limited to the aforementioned problems, and any other technical problems not mentioned herein will be clearly understood from the following description by those skilled in the art to which the present disclosure pertains.

According to an embodiment of the present disclosure, a vehicle approach notification device may include a camera that captures an image around a vehicle, a sensor module that collects environmental data around the vehicle, a lamp that operates depending on on/off manipulation in the vehicle, and at least one processor electrically connected with the camera, the sensor module, and the lamp. The at least one processor may be configured to detect an obstacle being present in the direction of progress of the vehicle using the camera and the sensor module, may be configured to analyze an angle of the obstacle, the angle corresponding to an angle formed by a reference axis corresponding to the direction of travel of the vehicle and a first straight line, and an amount of protrusion of the obstacle, may be configured to determine a vehicle entry notification display area based on the angle of the obstacle and the amount of protrusion of the obstacle, and may be configured to output a notification to be displayed on the vehicle entry notification display area, by the lamp. The first straight line may be a straight line connecting a center of a front end or a rear end of the vehicle with an outermost point of the obstacle.

In an embodiment, the at least one processor may be configured to determine the vehicle entry notification display area, when an operation mode of the lamp may be turned on, when a speed of the vehicle may be less than a threshold, and when a gear of the vehicle may be set to a reverse (R) stage or a drive (D) stage.

In an embodiment, the at least one processor may be configured to determine a first area including a view space area and a view space symmetric area, based on the angle of the obstacle and the amount of protrusion of the obstacle, when the amount of protrusion of the obstacle with respect to the vehicle may be less than a threshold, and may determine the vehicle entry notification display area in the first area.

In an embodiment, the at least one processor may be configured to continuously update the amount of protrusion of the obstacle and may update the vehicle entry notification display area depending on the amount of updated protrusion of the obstacle.

In an embodiment, the at least one processor may be configured to change at least one of a phrase of the notification, a size of the notification, or a combination thereof, based on the first area varying with motion of the vehicle.

In an embodiment, the at least one processor may be configured to output the notification to be displayed on the vehicle entry notification display area, when a moving object connected with the vehicle through communication may not be identified around the vehicle. The moving object may include at least one of a pedestrian, another vehicle, or a combination thereof.

In an embodiment, the at least one processor may be configured to output the notification to be displayed on the vehicle entry notification display area when it may be determined that a moving object connected with the vehicle through communication approaches in a direction opposite to the direction of travel of the vehicle or that the moving object may be out of a specified distance from the vehicle, when the moving object may be identified around the vehicle. The moving object may include at least one of a pedestrian, another vehicle, or a combination thereof.

In an embodiment, the at least one processor may be configured to output the notification to be displayed on a second area being at least a portion of the vehicle entry notification display area when it may be determined that a moving object connected with the vehicle through communication approaches in a direction being the same as the direction of travel of the vehicle or that the moving object may be within a specified distance from the vehicle, when the moving object may be identified around the vehicle. The moving object may include at least one of a pedestrian, another vehicle, or a combination thereof.

In an embodiment, the second area may be determined based on a direction of the moving object and a field of view of the moving object.

In an embodiment, the notification may include at least one of a phrase indicating entry of the vehicle, a phrase indicating the direction of entry of the vehicle, a phrase indicating a distance between the vehicle entry notification display area and the vehicle, or a combination thereof.

According to another embodiment of the present disclosure, a vehicle approach notification method may include detecting, by at least one processor, an obstacle being present in the direction of travel of a vehicle using a camera and a sensor module, analyzing, by the at least one processor, an angle of the obstacle, the angle corresponding to an angle formed by a reference axis corresponding to the direction of travel of the vehicle and a first straight line, and an amount of protrusion of the obstacle, determining, by the at least one processor, a vehicle entry notification display area based on the angle of the obstacle and the amount of protrusion of the obstacle, and outputting, by the at least one processor, a notification to be displayed on the vehicle entry notification display area, by means of a lamp. The first straight line may be a straight line connecting a center of a front end or a rear end of the vehicle with an outermost point of the obstacle.

In an embodiment, the determining of the vehicle entry notification display area may include determining, by the at least one processor, the vehicle entry notification display area, when an operation mode of the lamp may be turned on, when a speed of the vehicle may be less than a threshold, and when a gear of the vehicle may be set to a reverse (R) stage or a drive (D) stage.

In an embodiment, the determining of the vehicle entry notification display area may include determining, by the at least one processor, a first area including a view space area and a view space symmetric area, based on the angle of the obstacle and the amount of protrusion of the obstacle, when the amount of protrusion of the obstacle with respect to the vehicle may be less than a threshold, and determining, by the at least one processor, the vehicle entry notification display area in the first area.

In an embodiment, the vehicle approach notification method may further include continuously updating, by the at least one processor, the amount of protrusion of the obstacle and updating, by the at least one processor, the vehicle entry notification display area depending on the amount of updated protrusion of the obstacle.

In an embodiment, the vehicle approach notification method may further include changing at least one of a phrase of the notification, a size of the notification, or a combination thereof, based on the first area varying with motion of the vehicle.

In an embodiment, the outputting of the notification may include outputting, by the at least one processor, the notification to be displayed on the vehicle entry notification display area, when a moving object connected with the vehicle through communication may not be identified around the vehicle. The moving object may include at least one of a pedestrian, another vehicle, or a combination thereof.

In an embodiment, the outputting of the notification may include outputting, by the at least one processor, the notification to be displayed on the vehicle entry notification display area when it may be determined that a moving object connected with the vehicle through communication approaches in a direction opposite to the direction of travel of the vehicle or the moving object may be out of a specified distance from the vehicle, when the moving object may be identified around the vehicle. The moving object may include at least one of a pedestrian, another vehicle, or a combination thereof.

In an embodiment, the outputting of the notification may include outputting, by the at least one processor, the notification to be displayed on a second area being at least a portion of the vehicle entry notification display area when it may be determined that a moving object connected with the vehicle through communication approaches in a direction being the same as the direction of travel of the vehicle or that the moving object may be within a specified distance from the vehicle, when the moving object may be identified around the vehicle. The moving object may include at least one of a pedestrian, another vehicle, or a combination thereof.

In an embodiment, the second area may be determined based on a direction of the moving object and a field of view of the moving object.

In an embodiment, the notification may include at least one of a phrase indicating entry of the vehicle, a phrase indicating the direction of entry of the vehicle, a phrase indicating a distance between the vehicle entry notification display area and the vehicle, or a combination thereof.

BRIEF DESCRIPTION OF THE DRAWINGS

The above and other objects, features and advantages of the present disclosure will be more apparent from the following detailed description taken in conjunction with the accompanying drawings:

FIG. 4 illustrates an example of output notification contents in a vehicle approach notification device and a method therefor according to an embodiment of the present disclosure;

DETAILED DESCRIPTION

Figure 1:
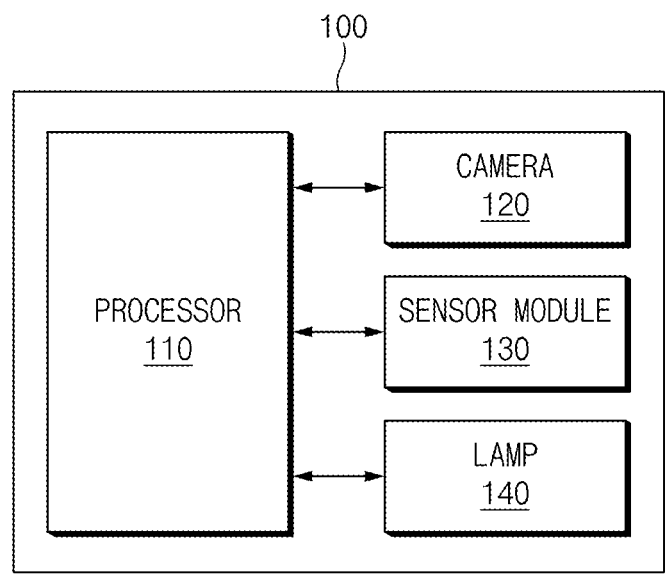
FIG. 1 is a block diagram of a vehicle approach notification device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms may be only used to distinguish one element from another element, but do not limit the corresponding elements irrespective of the order or priority of the corresponding elements. Furthermore, unless otherwise defined, all terms including technical and scientific terms used herein may be to be interpreted as may be customary in the art to which the present disclosure belongs. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

Hereinafter, embodiments of the present disclosure will be described in detail with reference to FIGS. 1 to 12.

FIG. 1 is a block diagram of a vehicle approach notification device according to an embodiment of the present disclosure.

Referring to FIG. 1, the vehicle approach notification device 100 according to an embodiment may include a processor 110, a camera 120, a sensor module 130, and a lamp 140. In various embodiments, the vehicle approach notification device 100 may include an additional component other than the components shown in FIG. 1, or may omit at least one of the components shown in FIG. 1.

According to an embodiment, the processor 110 may be electrically connected with the camera 120, the sensor module 130, and the lamp 140 and may electrically control the respective components. The processor 110 may be an electrical circuit which executes instructions of software and may perform a variety of data processing and calculation described below.

According to an embodiment, the processor 110 may include, for example, an electronic control unit (ECU), a micro controller unit (MCU), or another sub-controller, which may be loaded into the vehicle.

According to an embodiment, the processor 110 may be configured to execute calculation and data processing about control and/or communication of at least one other component of the vehicle approach notification device 100 using instructions stored in a memory (not shown).

According to an embodiment, the camera 120 may be a module loaded into the vehicle to capture an image around the vehicle, which may include a front view camera, a rear view camera, and a rear side view camera.

According to an embodiment, the camera 120 may be configured to obtain a rear view image and/or a front view image of the vehicle.

According to an embodiment, the sensor module 130 may include a sensor fusion system.

According to an embodiment, the sensor module 130 may include, but may not be limited to, a radio detection and ranging (RaDAR) and a light detection and ranging (LiDAR). The sensor module 130 may include various sensors capable of collecting vehicle data.

According to an embodiment, the RaDAR may be configured to scan an area in front of the vehicle to detect an object on the road (or the lane).

According to an embodiment, the RaDAR may be configured to emit electromagnetic waves of microwaves to an object and may receive electromagnetic waves reflected from the object to detect a distance from the object, a direction of the object, an altitude of the object, or the like.

According to an embodiment, the LiDAR may be configured to scan a forward area using laser beams having properties close to radio waves to detect an object on the road.

According to an embodiment, the lamp 140 may be composed of a light-emitting diode (LED). A solid color LED or a tricolor (RGB) LED may be used as the lamp 140.

According to an embodiment, the lamp 140 may radiate light depending on a control signal received from the processor 110.

According to an embodiment, the lamp 140 may radiate light to the front or rear of the vehicle depending on the control signal received from the processor 110.

Figure 2:
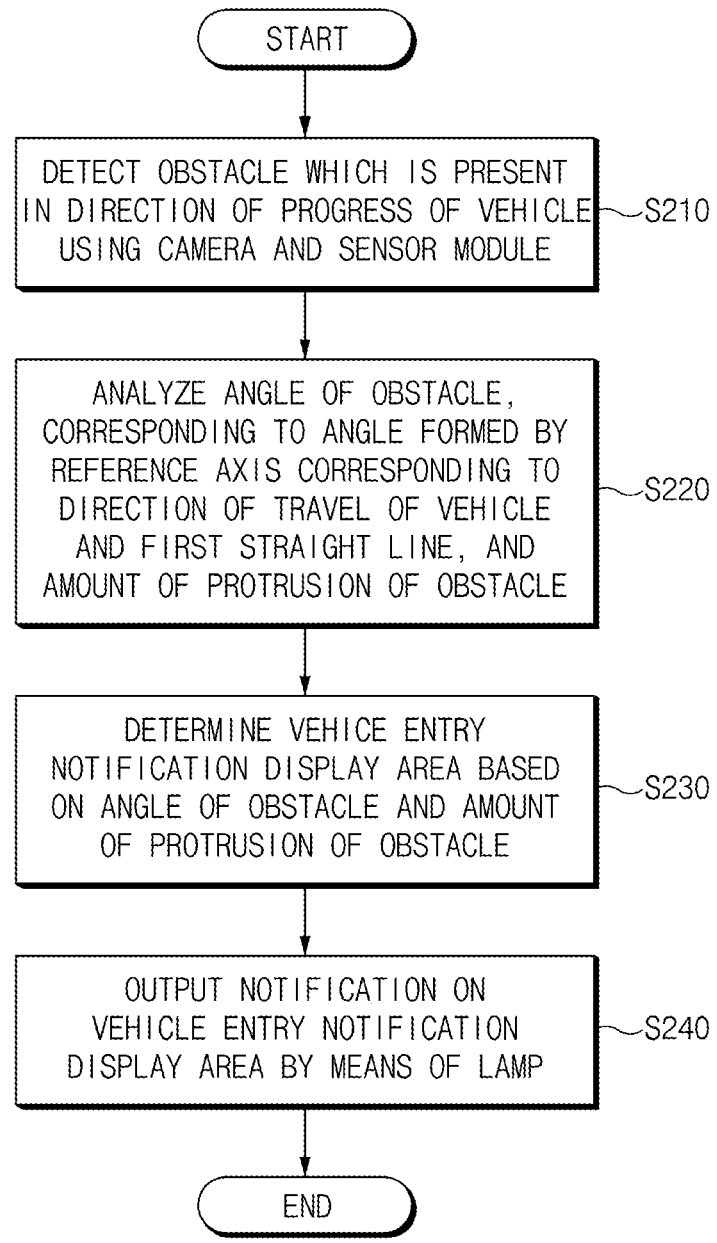
FIG. 2 is a flowchart illustrating a vehicle approach notification method according to an embodiment of the present disclosure.

FIG. 2 is a flowchart illustrating a vehicle approach notification method according to an embodiment of the present disclosure.

Operations in S210 to S240 in an embodiment below may be sequentially performed, but may not be necessarily sequentially performed. For example, an order of the respective operations may be changed, and at least two operations may be performed in parallel.

Referring to FIG. 2, in a vehicle approach notification device and a method therefor according to an embodiment, in S210, a processor may detect an obstacle which may be present in the direction of progress of a vehicle using a camera and a sensor module.

According to an embodiment, the processor may identify whether there is an obstacle in the direction of travel of the vehicle by means of the camera.

For example, when the gear of the vehicle is set to a drive (D) stage, the processor may identify whether there is an obstacle in the direction of travel of the vehicle by means of a front view camera.

For another example, when the gear of the vehicle is set to a reverse (D) stage, the processor may identify whether there is an obstacle in the direction of travel of the vehicle by means of a rear view camera.

According to an embodiment, the processor may be configured to detect an obstacle which may be present in the direction of travel of the vehicle by means of the sensor module.

According to an embodiment, the processor may be configured to detect an obstacle which may be present in front of the vehicle, behind the vehicle, or at a side of the vehicle by means of the sensor module.

According to an embodiment, the processor may be configured to detect an obstacle which may be present in front of the vehicle, behind the vehicle, or to a side of the vehicle using a RaDAR and/or a LiDAR.

According to an embodiment, in S220, the processor may analyze an angle of the obstacle, corresponding to an angle formed by a reference axis corresponding to the direction of travel of the vehicle and a first straight line, and an amount of protrusion of the obstacle.

According to an embodiment, the processor may be configured to analyze the angle of the obstacle and the amount of protrusion of the obstacle using the camera and/or the sensor module.

According to an embodiment, the angle of the obstacle may correspond to the angle formed by the reference axis corresponding to the direction of travel of the vehicle and the first straight line. Herein, the first straight line may be a straight line connecting a center of a front end or a rear end of the vehicle with an outermost point of the obstacle.

According to an embodiment, the amount of protrusion of the obstacle may correspond to an amount in which the obstacle protrudes with respect to the front end or the rear end of the vehicle. For example, the amount of protrusion of the obstacle may correspond to a vertical distance to an axis extending horizontally from the outermost point of the obstacle with reference to the front end or the rear end of the vehicle.

According to an embodiment, in S230, the processor may determine a vehicle entry notification display area, based on the angle of the obstacle and the amount of protrusion of the obstacle.

According to an embodiment, the processor may calculate a view space area, based on the angle of the obstacle and the amount of protrusion of the obstacle.

According to an embodiment, the processor may determine a first area including the view space area and a view space symmetric area.

According to an embodiment, the first area may be an area in front of the vehicle and may be an area behind the vehicle.

According to an embodiment, the processor may be configured to determine the vehicle entry notification display area in the first area. For example, at least a portion of the first area may be determined as the vehicle entry notification display area. Furthermore, for example, the first area may be determined as the vehicle entry notification display area.

According to an embodiment, the processor may be configured to continuously update the amount of protrusion of the obstacle and may update the vehicle entry notification display area depending the amount of updated protrusion of the obstacle.

According to an embodiment, in S240, the processor may output a notification to be displayed on the vehicle entry notification display area, by means of a lamp.

According to an embodiment, when the vehicle entry notification display area may be determined, the processor may output the notification on the vehicle entry notification display area, by means of the lamp.

For example, the notification may include at least one of a phrase indicating entry of the vehicle, a phrase indicating the direction of entry of the vehicle, a phrase indicating a distance between the vehicle entry notification display area and the vehicle, or a combination thereof.

According to an embodiment, the processor may change at least one of a phase of the notification displayed on the vehicle entry notification display area, a size of the notification, or a combination thereof, based on the first area which varies with motion of the vehicle.

Figure 3:
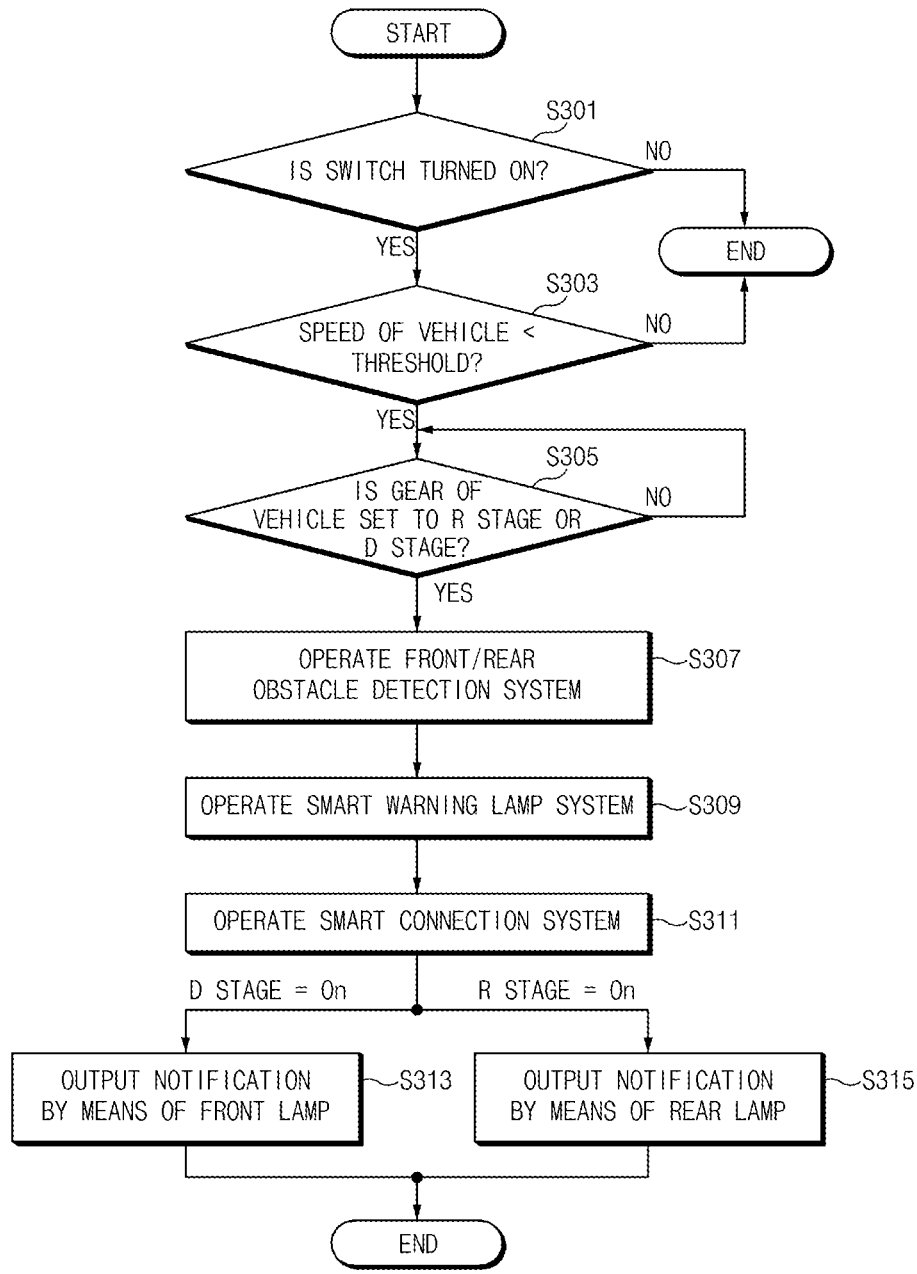
FIG. 3 is a flowchart illustrating outputting a notification using at least one system in a vehicle approach notification device and a method therefor according to an embodiment of the present disclosure.

FIG. 3 is a flowchart illustrating outputting a notification using at least one system in a vehicle approach notification device and a method therefor according to an embodiment of the present disclosure.

Operations in S301 to S315 in an embodiment below may be sequentially performed, but may not be necessarily sequentially performed. For example, an order of the respective operations may be changed, and at least two operations may be performed in parallel.

Referring to FIG. 3, in the vehicle approach notification device and the method therefor according to an embodiment, in S301, a processor may identify whether a switch of a vehicle entry notification output system is turned on. According to an embodiment, the processor may identify whether an operation mode of a lamp is turned on. According to an embodiment, the processor may identify whether a vehicle entry notification output function is activated.

According to an embodiment, the processor may be configured to identify whether the switch of the vehicle entry notification output system is turned on by detecting on/off manipulation of a mechanical switch.

According to an embodiment, the processor may be configured to identify whether the switch of the vehicle entry notification output system is turned on through a user select mode.

According to an embodiment, when it is determined that the switch of the vehicle entry notification output system is turned on (YES of S301), in S303, the processor may determine whether a speed of a vehicle is less than a threshold.

According to an embodiment, when it is determined that the switch of the vehicle entry notification output system is turned off (NO of S301), the processor may end the process.

According to an embodiment, in the state where the switch of the vehicle entry notification output system is turned on, the processor may determine whether the speed of the vehicle is less than the threshold (e.g., 10 km/h).

According to an embodiment, when it is determined that the speed of the vehicle is less than the threshold (YES of S303), in S305, the processor may determine whether the gear of the vehicle is set to an R stage or a D stage.

According to an embodiment, when it is determined that the gear of the vehicle is not set to the R stage or the D stage (NO of S305), the vehicle may return to S303.

According to an embodiment, when it is determined that the gear of the vehicle is set to the R stage or the D stage (YES of S305), in S307, the processor may operate a front/rear obstacle detection system.

According to an embodiment, the processor may operate the front/rear obstacle detection system to analyze an angle of the obstacle and an amount of protrusion of the obstacle.

Details of the front/rear obstacle detection system will be described below with reference to FIG. 5.

According to an embodiment, in S309, the processor may operate a smart warning lamp system.

According to an embodiment, the processor may operate the smart warning lamp system to determine a view space area and a view space symmetric area.

Details of the smart warning lamp system will be described below with reference to FIG. 7.

According to an embodiment, in S311, the processor may operate a smart connection system.

According to an embodiment, the processor may be configured to operate the smart connection system to determine whether there is a moving object, connected with the vehicle through communication, around the vehicle.

For example, the moving object may include at least one of a pedestrian, another vehicle, or a combination thereof.

Details of the smart connection system will be described below with reference to FIG. 9.

According to an embodiment, when the gear is set to a D stage, in S313, the processor may output a notification by means of a front lamp.

According to an embodiment, when the gear is set to the D stage, the processor may output a notification to be displayed on a first area in a front area.

According to an embodiment, when the gear is set to an R stage, in S315, the processor may output a notification by means of a rear lamp.

According to an embodiment, when the gear is set to the R stage, the processor may output a notification to be displayed on a first area in a rear area.

FIG. 4 illustrates an example of output notification contents in a vehicle approach notification device and a method therefor according to an embodiment of the present disclosure.

Referring to FIG. 4, in the vehicle approach notification device and the method therefor according to an embodiment of the present disclosure, a processor may output a notification to be displayed on a vehicle entry notification display area, by means of a lamp.

According to an embodiment, the notification displayed on the vehicle entry notification display area may include a phrase for warning a pedestrian or a driver of another vehicle.

For example, the notification displayed on the vehicle entry notification display area may include at least one of a phrase indicating entry of the vehicle, a phrase indicating the direction of entry of the vehicle, a phrase indicating a distance between the vehicle entry notification display area and the vehicle, or a combination thereof.

Figure 5:
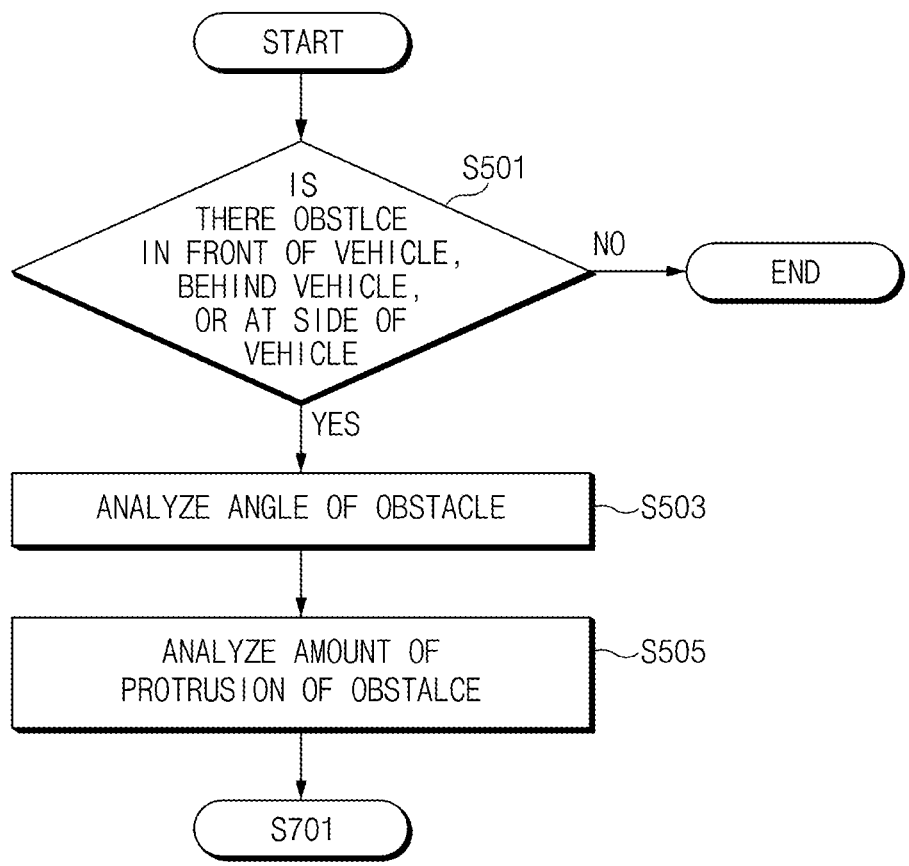
FIG. 5 is a flowchart illustrating detecting an obstacle in a vehicle approach notification device and a method therefor according to an embodiment of the present disclosure.

FIG. 5 is a flowchart illustrating detecting an obstacle in a vehicle approach notification device and a method therefor according to an embodiment of the present disclosure.

Operations in S501 to S505 in an embodiment below may be sequentially performed, but are not necessarily sequentially performed. For example, an order of the respective operations may be changed, and at least two operations may be performed in parallel.

Referring to FIG. 5, in the vehicle approach notification device and the method therefor according to an embodiment, a processor may operate a first system (e.g., a front/rear obstacle detection system).

According to an embodiment, in S501, the processor may determine whether there is an obstacle in front of a vehicle, behind the vehicle, or at a side of the vehicle.

According to an embodiment, the processor may identify whether there is an obstacle in the direction of travel of the vehicle by means of a camera.

For example, when the gear of the vehicle is set to a D stage, the processor may be configured to identify whether there is an obstacle in the direction of travel of the vehicle by means of a front view camera.

For another example, when the gear of the vehicle is set to an R stage, the processor may be configured to identify whether there is an obstacle in the direction of travel of the vehicle by means of a rear view camera.

According to an embodiment, the processor may be configured to detect an obstacle which may be present in the direction of travel of the vehicle by means of a sensor module.

According to an embodiment, the processor may be configured to detect an obstacle which may be present in front of the vehicle, behind the vehicle, or at a side of the vehicle by means of the sensor module.

According to an embodiment, the processor may be configured to detect an obstacle that may be present in front of the vehicle, behind the vehicle, or at a side of the vehicle using a RaDAR and/or a LiDAR.

According to an embodiment, it may be determined that there is the obstacle in front of the vehicle, behind the vehicle, or at the side of the vehicle (YES of S501), in S503, the processor may analyze an angle of the obstacle.

According to an embodiment, the processor may analyze the angle of the obstacle using the camera and/or the sensor module.

According to an embodiment, the angle of the obstacle may correspond to an angle formed by a reference axis corresponding to the direction of travel of the vehicle and a first straight line. Herein, the first straight line may be a straight line connecting a center of a front end or a rear end of the vehicle with an outermost point of the obstacle.

According to an embodiment, in S505, the processor may analyze an amount of protrusion of the obstacle.

According to an embodiment, the processor may analyze the amount of protrusion of the obstacle using the camera and/or the sensor module.

According to an embodiment, the amount of protrusion of the obstacle may correspond to an amount in which the obstacle protrudes with respect to the front end or the rear end of the vehicle. For example, the amount of protrusion of the obstacle may correspond to a vertical distance to an axis extending horizontally from the outermost point of the obstacle with respect to the front end or the rear end of the vehicle.

According to an embodiment, after analyzing the angle of the obstacle and the amount of protrusion of the obstacle, the processor may operate a second system (e.g., a smart warning lamp system).

Details of the smart waning lamp system will be described below with reference to FIG. 7.

Figure 6:
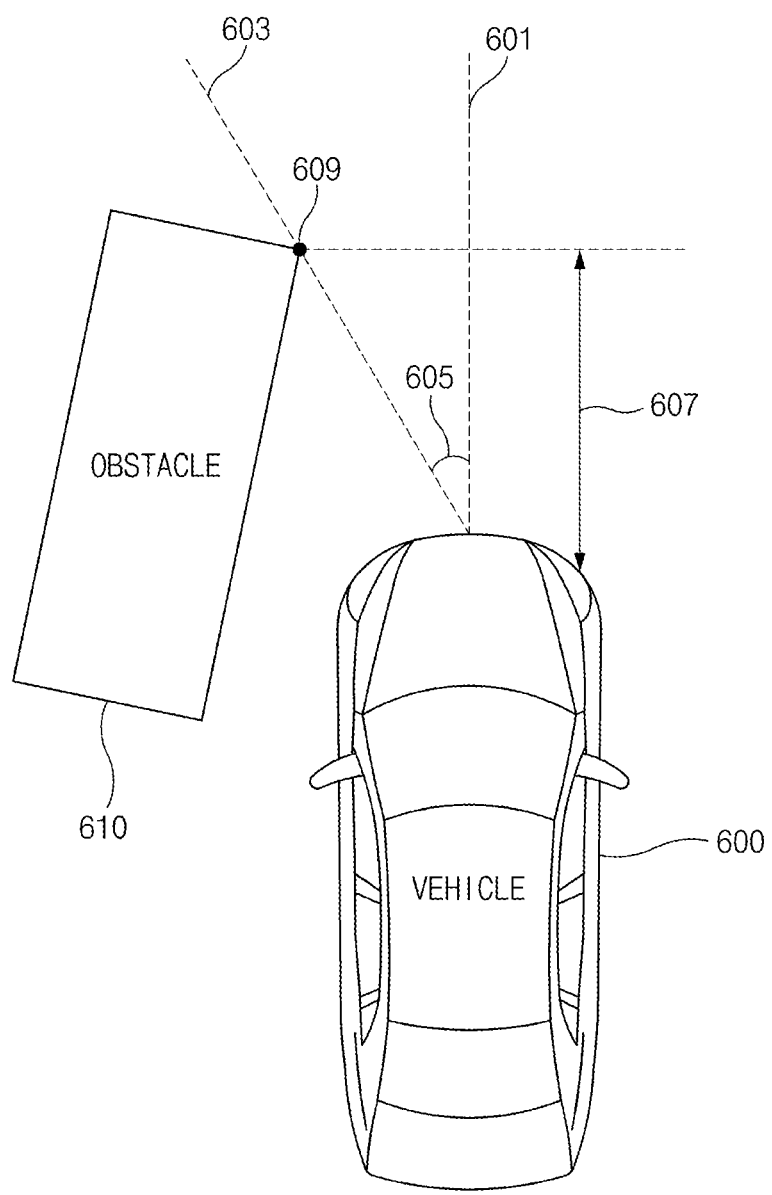
FIG. 6 illustrates an example of analyzing an angle of an obstacle and an amount of protrusion of the obstacle in a vehicle approach notification device and a method therefor according to an embodiment of the present disclosure.

FIG. 6 illustrates an example of analyzing an angle of an obstacle and an amount of protrusion of the obstacle in a vehicle approach notification device and a method therefor according to an embodiment of the present disclosure.

Referring to FIG. 6, in the vehicle approach notification device and the method therefor according to an embodiment, a processor may analyze an angle of an obstacle and an amount of protrusion of the obstacle using a camera and/or a sensor module.

According to an embodiment, the processor may determine an angle formed by a reference axis 601 corresponding to the direction of travel of a vehicle 600 and a first straight line 603 as an angle 605 of an obstacle 610.

According to an embodiment, the first straight line 603 may be a straight line connecting a center of a front end or a rear end of the vehicle 600 with an outermost point 609 of the obstacle 610.

According to an embodiment, the processor may determine an amount where the obstacle 610 protrudes with respect to the front end or the rear end of the vehicle 600 as an amount 607 of protrusion of the obstacle 610.

According to an embodiment, the amount 607 of protrusion of the obstacle 610 may correspond to a vertical distance to an axis extending horizontally from the outermost point 609 of the obstacle 610 with respect to the front end or the rear end of the vehicle 600.

Figure 7:
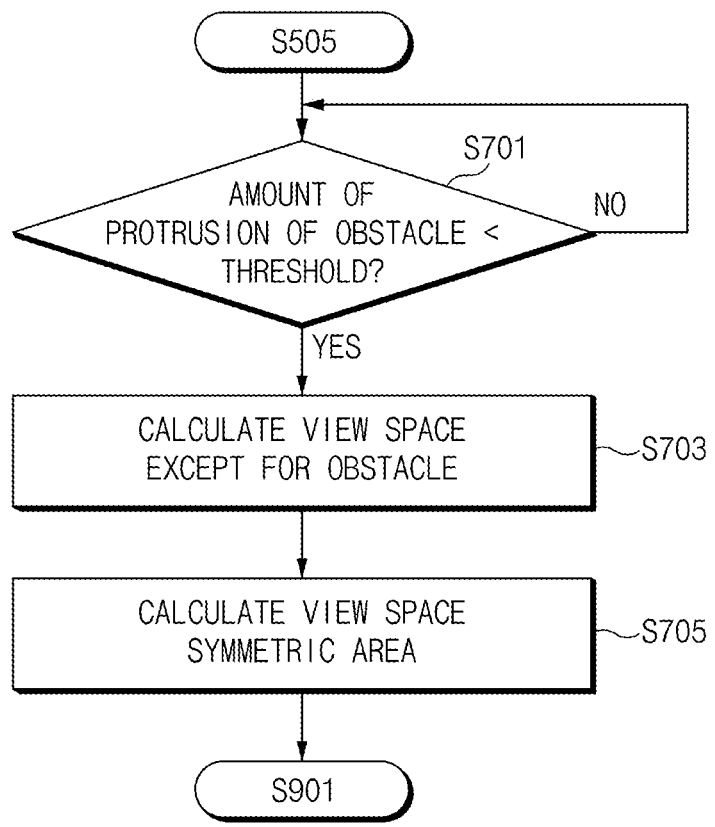
FIG. 7 is a flowchart illustrating calculating a vehicle entry notification display area in a vehicle approach notification device and a method therefor according to an embodiment of the present disclosure.

FIG. 7 is a flowchart illustrating calculating a vehicle entry notification display area in a vehicle approach notification device and a method therefor according to an embodiment of the present disclosure.

Operations in S701 to S705 in an embodiment below may be sequentially performed, but are not necessarily sequentially performed. For example, an order of the respective operations may be changed, and at least two operations may be performed in parallel.

Referring to FIG. 7, in the vehicle approach notification device and the method therefor according to an embodiment, a processor may operate a second system (e.g., a smart warning lamp system).

According to an embodiment, in S701, the processor may determine whether the amount of protrusion of an obstacle is less than a threshold.

According to an embodiment, after the second system (e.g., the smart warning lamp system) is operated, the processor may determine whether the amount of protrusion of the obstacle may be less than the threshold (e.g., 2 m).

According to an embodiment, when it is determined that the amount of protrusion of the obstacle is not less than the threshold (NO for S701), the processor may continue determining whether the amount of protrusion of the obstacle is less than the threshold.

According to an embodiment, when it is determined that the amount of protrusion of the obstacle is less than the threshold (YES for S701), in S703, the processor may calculate a view space except for the obstacle. In the present disclosure, the view space may be referred to as a view space area.

According to an embodiment, when the amount of protrusion of the obstacle may be less than the threshold, the processor may identify a view inference space due to the obstacle and may calculate the view space. For example, the view space may include a space which does not overlap the obstacle.

According to an embodiment, the processor may be configured to determine a view space area, based on the calculated view space.

According to an embodiment, in S705, the processor may be configured to calculate a view space symmetric area.

According to an embodiment, after determining the view space area, the processor may calculate a view space symmetric area which is symmetrical with the view space area.

According to an embodiment, the processor may determine a first area including the view space area and the view space symmetric area.

According to an embodiment, the processor may determine a vehicle entry notification display area in the first area.

According to an embodiment, the processor may continuously update the amount of protrusion of the obstacle.

According to an embodiment, the processor may update the vehicle entry notification display area depending the amount of updated protrusion of the obstacle.

According to an embodiment, the processor may change at least one of a phase of a notification displayed on the vehicle entry notification display area, a size of the notification, or a combination thereof, based on the first area which varies with motion of the vehicle.

According to an embodiment, after the second system may be operated, the processor may be configured to operate a third system (e.g., a smart connection system).

Details of the smart connection system will be described below with reference to FIG. 9.

Figure 8:
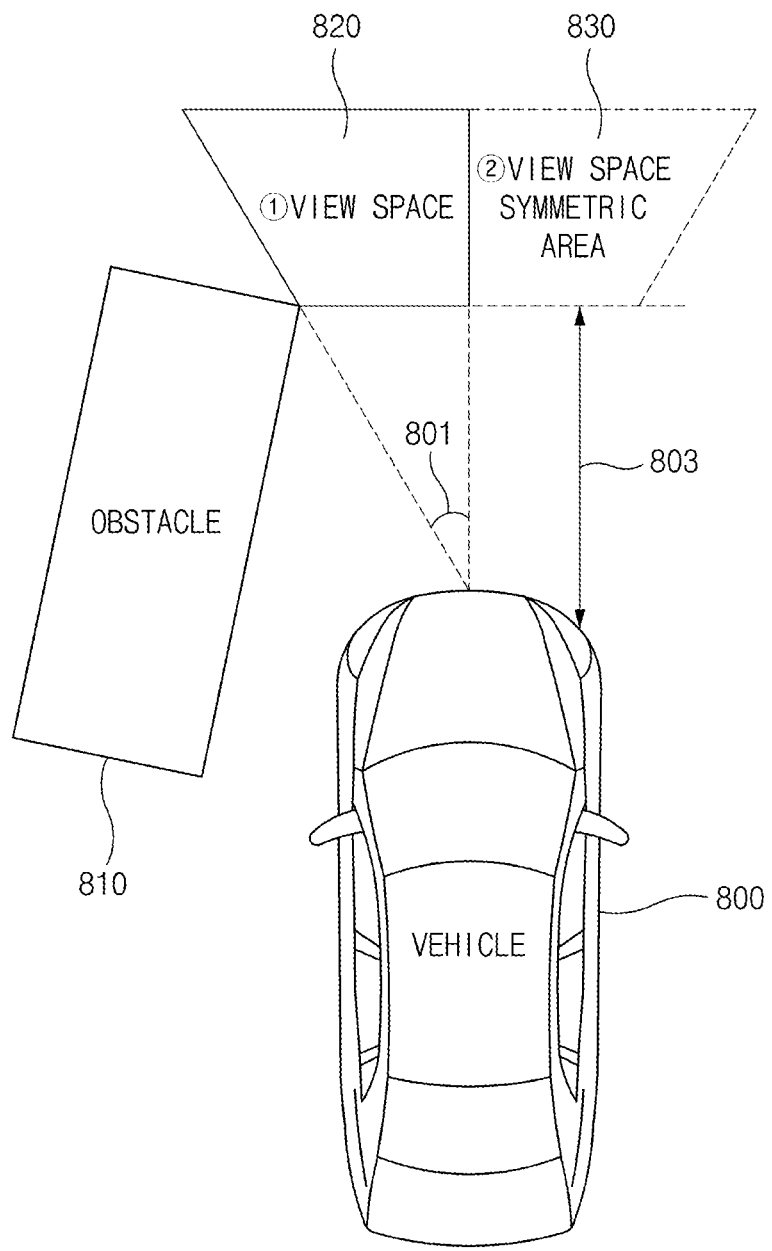
FIG. 8 illustrates an example of calculating a vehicle entry notification display area in a vehicle approach notification device and a method therefor according to an embodiment of the present disclosure.

FIG. 8 illustrates an example of calculating a vehicle entry notification display area in a vehicle approach notification device and a method therefor according to an embodiment of the present disclosure.

Referring to FIG. 8, in the vehicle approach notification device and the method therefor according to an embodiment, a processor may determine a vehicle entry notification display area based on an angle 801 of an obstacle 810 and an amount 803 of protrusion of the obstacle 810.

According to an embodiment, when it is determined that the amount 803 of protrusion of the obstacle 810 is less than a threshold, the processor may identify a view inference space due to the obstacle 810, based on the angle 801 of the obstacle 810 and the amount 803 of protrusion of the obstacle 810, and may calculate a view space 820.

According to an embodiment, after calculating the view space 820, the processor may calculate a view space symmetric area 830 which is symmetrical with the view space 820.

According to an embodiment, the processor may determine a first area including the view space 820 the view space symmetric area 830.

According to an embodiment, the processor may determine the vehicle entry notification display area in the first area.

According to an embodiment, the processor may change at least one of a phase of a notification displayed on the vehicle entry notification display area, a size of the notification, or a combination thereof, based on the first area which varies with motion of a vehicle 800.

Figure 9:
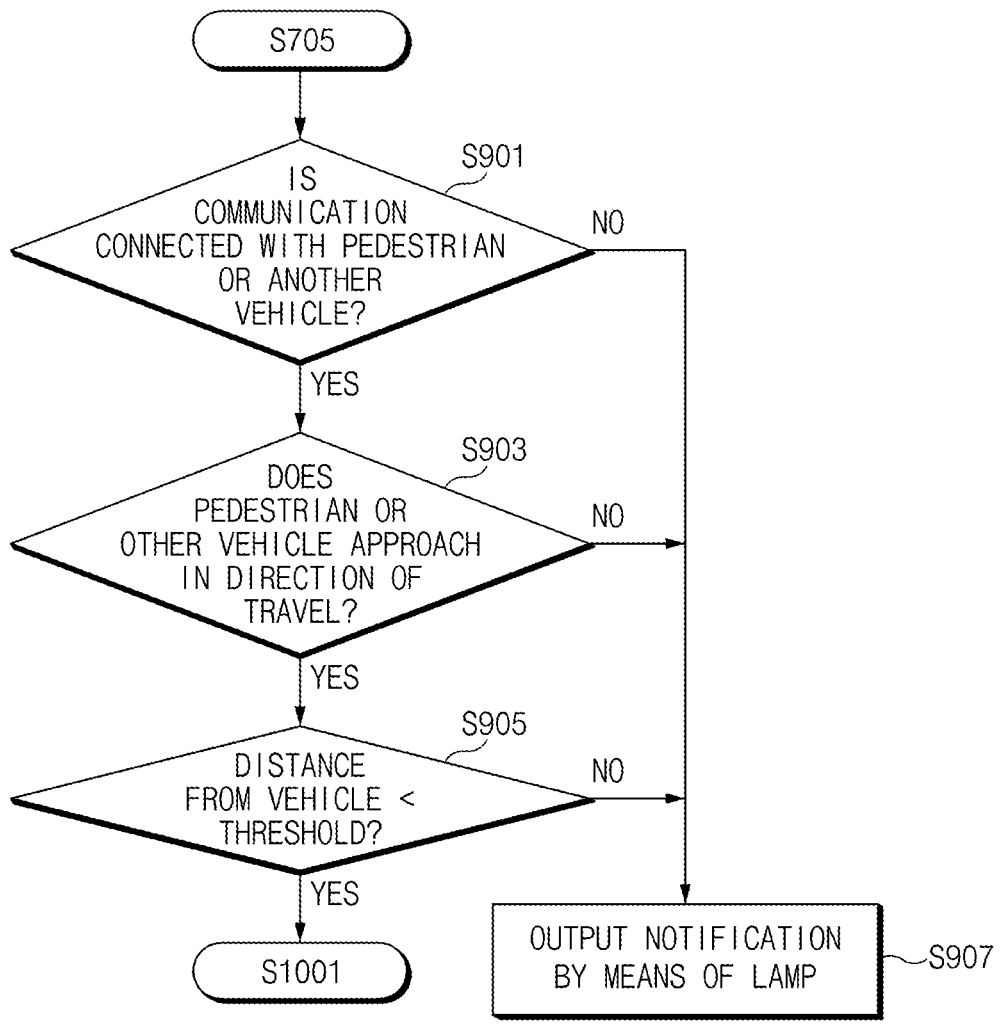
FIG. 9 is a flowchart illustrating identifying a moving object in a vehicle approach notification device and a method therefor according to an embodiment of the present disclosure.

FIG. 9 is a flowchart illustrating identifying a moving object in a vehicle approach notification device and a method therefor according to an embodiment of the present disclosure.

Operations in S901 to S907 in an embodiment below may be sequentially performed, but are not necessarily sequentially performed. For example, an order of the respective operations may be changed, and at least two operations may be performed in parallel.

Referring to FIG. 9, in the vehicle approach notification device and the method therefor according to an embodiment, a processor may operate a third system (e.g., a smart connection system).

According to an embodiment, in S901, the processor may identify whether communication may be connected with a pedestrian or another vehicle.

According to an embodiment, the processor may determine whether a pedestrian or another vehicle may be identified through the smart connection system.

According to an embodiment, when it is identified that the communication is not connected with the pedestrian or the other vehicle (NO of S901), in S907, the processor may output a notification by means of a lamp to be displayed on the vehicle entry notification display area determined in S705 of FIG. 7.

According to an embodiment, when it is identified that the communication is connected with the pedestrian or the other vehicle (YES of S901), in S903, the processor may determine whether the pedestrian or the other vehicle approaches in the direction of travel of the vehicle.

According to an embodiment, the processor may identify a location of the pedestrian or the other vehicle, with which the communication is connected, in real time.

According to an embodiment, the processor may identify the location of the pedestrian or the other vehicle in real time to determine whether the pedestrian or the other vehicle approaches in the direction of travel of the vehicle.

According to an embodiment, when it is determined that the pedestrian or the other vehicle does not approach in the direction of travel of the vehicle (NO of S903), in S907, the processor may output a notification by means of the lamp to be displayed on the vehicle entry notification display area determined in S705 of FIG. 7.

According to an embodiment, when it is determined that the pedestrian or the other vehicle approaches in the direction of travel of the vehicle (YES of S903), in S905, the processor may identify whether a distance between the pedestrian or the other vehicle and the vehicle is less than a threshold (or a specified distance).

According to an embodiment, the processor may identify whether the distance between the pedestrian or the other vehicle and the vehicle is less than the threshold (e.g., 20 m).

According to an embodiment, when it is determined that the distance between the pedestrian or the other vehicle and the vehicle is not less than the threshold (NO of S905), in S907, the processor may output a notification by means of the lamp to be displayed on the vehicle entry notification display area determined in S705 of FIG. 7.

According to an embodiment, when it is determined that the distance between the pedestrian or the other vehicle and the vehicle is less than the threshold (YES of S905), the processor may operate a fourth system (e.g., a smart warning lamp range control system).

Details of the smart warning lamp range control system will be described below with reference to FIG. 10.

Figure 10:
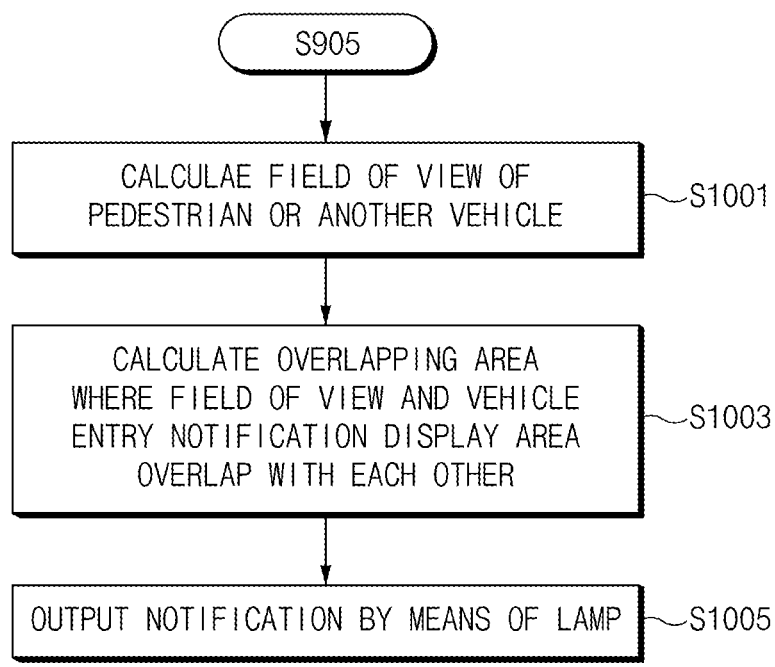
FIG. 10 is a flowchart illustrating calculating a vehicle entry notification display area based on a moving object in a vehicle approach notification device and a method therefor according to an embodiment of the present disclosure.

FIG. 10 is a flowchart illustrating calculating a vehicle entry notification display area based on a moving object in a vehicle approach notification device and a method therefor according to an embodiment of the present disclosure.

Operations in S1001 to S1005 in an embodiment below may be sequentially performed, but are not necessarily sequentially performed. For example, an order of the respective operations may be changed, and at least two operations may be performed in parallel.

Referring to FIG. 10, in the vehicle approach notification device and the method therefor according to an embodiment, a processor may operate a fourth system (e.g., a smart warning lamp range control system).

According to an embodiment, in S1001, the processor may calculate a field of view of a pedestrian or another vehicle.

According to an embodiment, the processor may identify the direction of progress of the pedestrian or the other vehicle approaching a vehicle.

According to an embodiment, the processor may calculate the field of view of the pedestrian or the other vehicle based on the direction of progress of the pedestrian or the other vehicle.

For example, the processor may calculate a range of left and right 30 degrees in the direction of progress of the pedestrian or the other vehicle as the field of view.

According to an embodiment, in S1003, the processor may calculate an overlapping area where the field of view and the vehicle entry notification display area overlap with each other.

For example, the processor may determine an overlapping area where the range of left and right 30 degrees in the direction of progress of the pedestrian or the other vehicle and the vehicle entry notification display area overlap with each other.

According to an embodiment, in S1005, the processor may output a notification by means of a lamp.

According to an embodiment, the processor may output the notification by means of the lamp to be displayed on the overlapping area.

According to an embodiment, the processor may change at least one of a phase of a notification displayed on the overlapping area, a size of the notification, or a combination thereof, based on the overlapping area.

Figure 11:
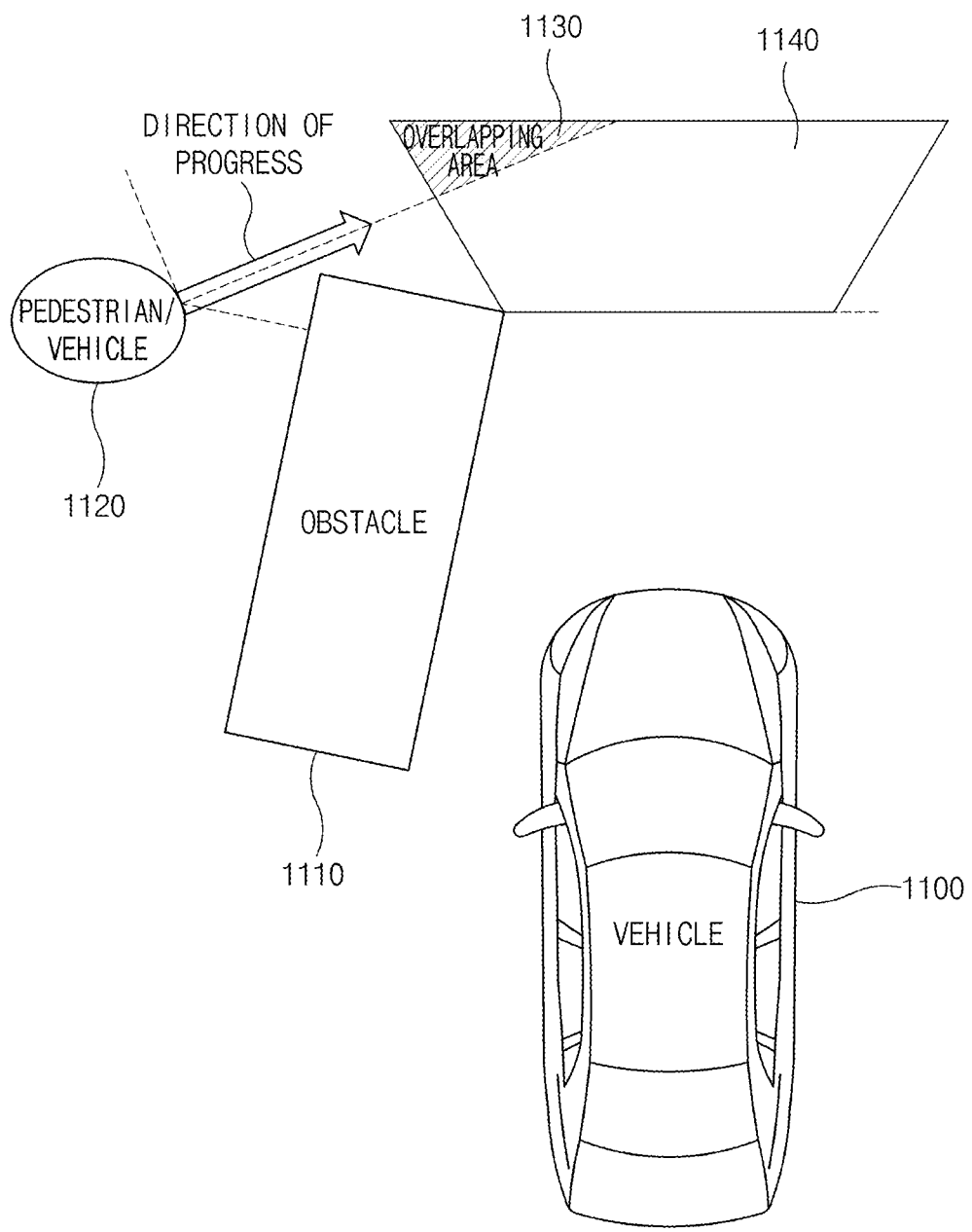
FIG. 11 illustrates an example of calculating a vehicle entry notification display area based on a moving object in a vehicle approach notification device and a method therefor according to an embodiment of the present disclosure.

FIG. 11 illustrates an example of calculating a vehicle entry notification display area based on a moving object in a vehicle approach notification device and a method therefor according to an embodiment of the present disclosure.

Referring to FIG. 11, in the vehicle approach notification device and the method therefor according to an embodiment, a processor may determine a vehicle entry notification display area 1140 based on a location of an obstacle 1110 (e.g., an angle of the obstacle 1110 and/or an amount of protrusion of the obstacle 1110).

According to an embodiment, the processor may calculate a field of view of a moving object 1120 (e.g., a pedestrian and/or another vehicle).

According to an embodiment, the processor may identify the direction of progress of the moving object 1120 approaching a vehicle 1100.

According to an embodiment, the processor may calculate the field of view of the moving object 1120 based on the direction of progress of the pedestrian or the moving object 1120.

For example, the processor may calculate a range of left and right 30 degrees in the direction of progress of the moving object 1120 as the field of view.

According to an embodiment, the processor may calculate an overlapping area 1130 where the field of view and the vehicle entry notification display area 1140 overlap with each other.

For example, the processor may determine the overlapping area 1130 where the range of left and right 30 degrees in the direction of progress of the moving object 1120 and the vehicle entry notification display area 1140 overlap with each other.

According to an embodiment, the processor may output a notification to be displayed on the overlapping area 1130 by means of a lamp.

According to an embodiment, the processor may change at least one of a phase of a notification displayed on the overlapping area 1130, a size of the notification, or a combination thereof, based on the overlapping area 1130.

Figure 12:
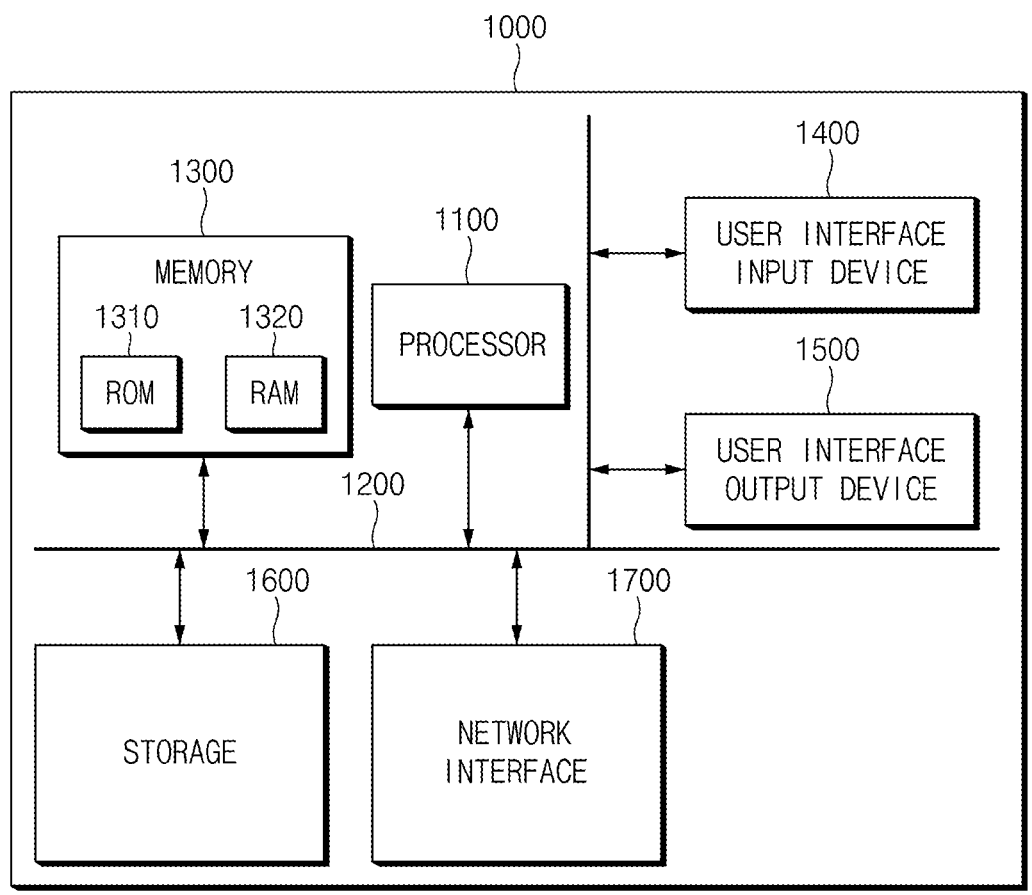
FIG. 12 illustrates a computing system about a vehicle approach notification device and a method therefor according to an embodiment of the present disclosure.

FIG. 12 illustrates a computing system about a vehicle approach notification device and a method therefor according to an embodiment of the present disclosure.

Referring to FIG. 12, a computing system 1000 about the vehicle approach notification device and the method therefor may include at least one processor 1100, a memory 1300, a user interface input device 1400, a user interface output device 1500, storage 1600, and a network interface 1700, which may be connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which may be executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the vehicle approach notification device and the method therefor according to an embodiment of the present disclosure.

According to at least one of embodiments of the present disclosure, the vehicle approach notification device may prevent an accident by providing a pedestrian or a driver of another vehicle with a vehicle entry notification.

In addition, various effects ascertained directly or indirectly through the present disclosure may be provided.

Although the present disclosure has been described with reference to exemplary embodiments and the accompanying drawings, the present disclosure may not be limited thereto, but may be variously modified and altered by those skilled in the art to which the present disclosure pertains without departing from the spirit and scope of the present disclosure claimed in the following claims.

Therefore, embodiments of the present disclosure may not be intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle approach notification device, comprising:
   a camera configured to capture an image around a vehicle;
   a sensor module configured to collect environmental data around the vehicle;
   a lamp configured to operate depending on an on/off manipulator; and
   at least one processor electrically connected with the camera, the sensor module, and the lamp, wherein the at least one processor is configured to:
      detect an obstacle being present in a direction of travel of the vehicle using the camera and the sensor module,
      analyze an angle of the obstacle, the angle corresponding to an angle formed by a reference axis corresponding to the direction of travel of the vehicle and a first straight line, and an amount of protrusion of the obstacle with respect to a front end or a rear end of the vehicle,
      determine a vehicle entry notification display area based on the angle of the obstacle and the amount of protrusion of the obstacle, and
      output a notification to be displayed on the vehicle entry notification display area, by the lamp,
      wherein the first straight line is a straight line connecting a center of a front end or a rear end of the vehicle with an outermost point of the obstacle, and
   wherein the at least one processor is further configured to:
      continuously update the amount of protrusion of the obstacle, and
      update the vehicle entry notification display area depending on the amount of updated protrusion of the obstacle;
      identify whether communication is connected with a moving object, when the communication is not connected, output the notification on the vehicle entry notification display area, and when the communication is connected:
 determine an approach direction and a distance of the moving object with respect to the vehicle, and
 dynamically control the vehicle entry notification display area based on the approach direction and the distance.

2. The vehicle approach notification device of claim 1, wherein the at least one processor is configured to determine the vehicle entry notification display area, when an operation mode of the lamp is turned on, when a speed of the vehicle is less than a threshold, or when a gear of the vehicle is set to a reverse (R) stage or a drive (D) stage.

3. The vehicle approach notification device of claim 1, wherein the at least one processor is configured to determine a first area including a view space area and a view space symmetric area, based on the angle of the obstacle and the amount of protrusion of the obstacle, when the amount of protrusion of the obstacle with respect to the vehicle is less than a threshold, and determine the vehicle entry notification display area in the first area.

4. The vehicle approach notification device of claim 3, wherein the at least one processor is configured to change at least one of a phrase of the notification, a size of the notification, or a combination thereof, based on the first area varying with motion of the vehicle.

5. The vehicle approach notification device of claim 1, wherein the moving object includes at least one of a pedestrian, another vehicle, or a combination thereof.

6. The vehicle approach notification device of claim 1, wherein the at least one processor is configured to output the notification to be displayed on the vehicle entry notification display area when it is determined that the moving object connected with the vehicle through communication approaches in a direction opposite to the direction of travel of the vehicle or that the moving object is out of a specified distance from the vehicle, when the moving object is identified around the vehicle, and
 wherein the moving object includes at least one of a pedestrian, another vehicle, or a combination thereof.

7. The vehicle approach notification device of claim 1, wherein the at least one processor is configured to output the notification to be displayed on a second area being at least a portion of the vehicle entry notification display area when it is determined that the moving object connected with the vehicle through communication approaches in a direction being the same as the direction of travel of the vehicle or that the moving object is within a specified distance from the vehicle, when the moving object is identified around the vehicle, and
 wherein the moving object includes at least one of a pedestrian, another vehicle, or a combination thereof.

8. The vehicle approach notification device of claim 7, wherein the second area is determined based on a direction of the moving object and a field of view of the moving object.

9. The vehicle approach notification device of claim 1, wherein the notification includes at least one of a phrase indicating entry of the vehicle, a phrase indicating the direction of entry of the vehicle, a phrase indicating a distance between the vehicle entry notification display area and the vehicle, or a combination thereof.

10. A vehicle approach notification method, comprising:
 detecting, by at least one processor, an obstacle being present in a direction of travel of a vehicle using a camera and a sensor module;
 analyzing, by the at least one processor, an angle of the obstacle, the angle corresponding to an angle formed by a reference axis corresponding to the direction of travel of the vehicle and a first straight line, and an amount of protrusion of the obstacle with respect to a front end or a rear end of the vehicle;
 determining, by the at least one processor, a vehicle entry notification display area based on the angle of the obstacle and the amount of protrusion of the obstacle; and
 outputting, by the at least one processor, a notification to be displayed on the vehicle entry notification display area, by a lamp,
 wherein the first straight line is a straight line connecting a center of a front end or a rear end of the vehicle with an outermost point of the obstacle; and
 wherein the method further comprises:
  continuously updating, by the at least one processor, the amount of protrusion of the obstacle, and
  updating, by the at least one processor, the vehicle entry notification display area depending on the amount of updated protrusion of the obstacle;
 further comprising:
  identifying, by the at least one processor, whether communication is connected with a moving object;
  when the communication is not connected, outputting the notification on the vehicle entry notification display area; and
  when the communication is connected:
   determine an approach direction and a distance of the moving object with respect to the vehicle, and
   dynamically controlling the vehicle entry notification display area based on the approach direction and the distance.

11. The vehicle approach notification method of claim 10, wherein the determining of the vehicle entry notification display area includes:
 determining, by the at least one processor, the vehicle entry notification display area, when an operation mode of the lamp is turned on, when a speed of the vehicle is less than a threshold, and when a gear of the vehicle is set to a reverse (R) stage or a drive (D) stage.

12. The vehicle approach notification method of claim 10, wherein the determining of the vehicle entry notification display area includes:
 determining, by the at least one processor, a first area including a view space area and a view space symmetric area, based on the angle of the obstacle and the amount of protrusion of the obstacle, when the amount of protrusion of the obstacle with respect to the vehicle is less than a threshold; and
 determining, by the at least one processor, the vehicle entry notification display area in the first area.

13. The vehicle approach notification method of claim 12, further comprising:
 changing at least one of a phrase of the notification, a size of the notification, or a combination thereof, based on the first area varying with motion of the vehicle.

14. The vehicle approach notification method of claim 10, wherein the moving object includes at least one of a pedestrian, another vehicle, or a combination thereof.

15. The vehicle approach notification method of claim 10, wherein the outputting of the notification includes:

outputting, by the at least one processor, the notification to be displayed on the vehicle entry notification display area when it is determined that the moving object connected with the vehicle through communication approaches in a direction opposite to the direction of travel of the vehicle or the moving object is out of a specified distance from the vehicle, when the moving object is identified around the vehicle, and wherein the moving object includes at least one of a pedestrian, another vehicle, or a combination thereof.

16. The vehicle approach notification method of claim 10, wherein the outputting of the notification includes:

outputting, by the at least one processor, the notification to be displayed on a second area being at least a portion of the vehicle entry notification display area when it is determined that the moving object connected with the vehicle through communication approaches in a direction being the same as the direction of travel of the vehicle or that the moving object is within a specified distance from the vehicle, when the moving object is identified around the vehicle, and wherein the moving object includes at least one of a pedestrian, another vehicle, or a combination thereof.

17. The vehicle approach notification method of claim 16, wherein the second area is determined based on a direction of the moving object and a field of view of the moving object.

18. The vehicle approach notification method of claim 10, wherein the notification includes at least one of a phrase indicating entry of the vehicle, a phrase indicating the direction of entry of the vehicle, a phrase indicating a distance between the vehicle entry notification display area and the vehicle, or a combination thereof.

* * * * *